United States Patent

[11] 3,622,020

[72] Inventor Gabor J. Sarvary
"Wellowdown," The Drive Whinwhistle Road, Wellow, near Romsey, England
[21] Appl. No. 800,098
[22] Filed Feb. 18, 1969
[45] Patented Nov. 23, 1971
[32] Priority Feb. 20, 1968
[33] Great Britain
[31] 8,123/68

[54] MECHANIZED PALLETIZED STORAGE SYSTEMS
8 Claims, 13 Drawing Figs.
[52] U.S. Cl. ................................................ 214/16.4 A, 214/83.26
[51] Int. Cl. .............................................. B65g 1/00
[50] Field of Search .......................................... 214/16.1 (4 C), 16.1 (4 D), 16.1 (4 E), 16.4, 16.4 (2), 16.1 (4), 16 B

[56] References Cited
UNITED STATES PATENTS
1,567,346 12/1925 Tunison et al. ............... 214/16.1 (6 B)
1,643,489 9/1927 Fitch ............................ 214/16.1 (4 F)
2,009,579 7/1935 Ewend ......................... 214/16.1 (4 D)
3,042,228 7/1962 Frangos ....................... 214/16.1 (4 E)
3,480,162 11/1969 Saul ............................. 214/16.4 (2)

Primary Examiner—Albert J. Makay
Attorney—Sparrow & Sparrow

ABSTRACT: In the present invention there is provided a three-dimensional pallet-storage system wherein goods are stored in pallets at a plurality of different storage levels and in a plurality of rows of storage locations at each level. Pallets are removed from an area of bulk storage by means of a transfer trolley and conveyed to a pallet replenishment area. A picking tower is located adjacent a live store area and has associated therewith a two-directional transfer device capable of removing pallets from the live store, to a point adjacent a handler, transferring the pallet after unloading of the goods in a direction normal to the direction of removal and then moving the pallet in the opposite direction from the removal direction to insert the pallet in an empty row of the live store. The transfer trolley and two-directional transfer device both have at least one cross travel member to effect the transfer of the pallets from one storage location to another.

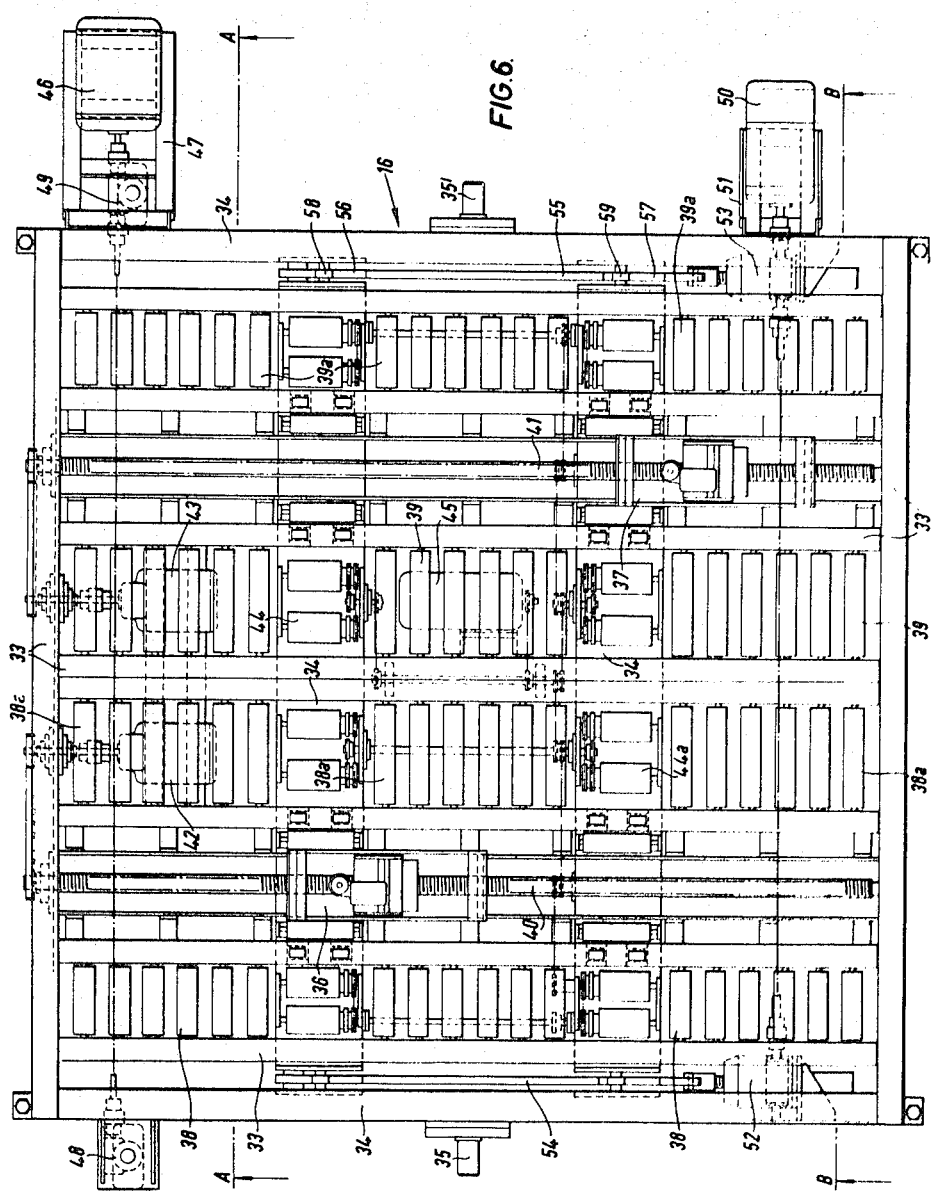

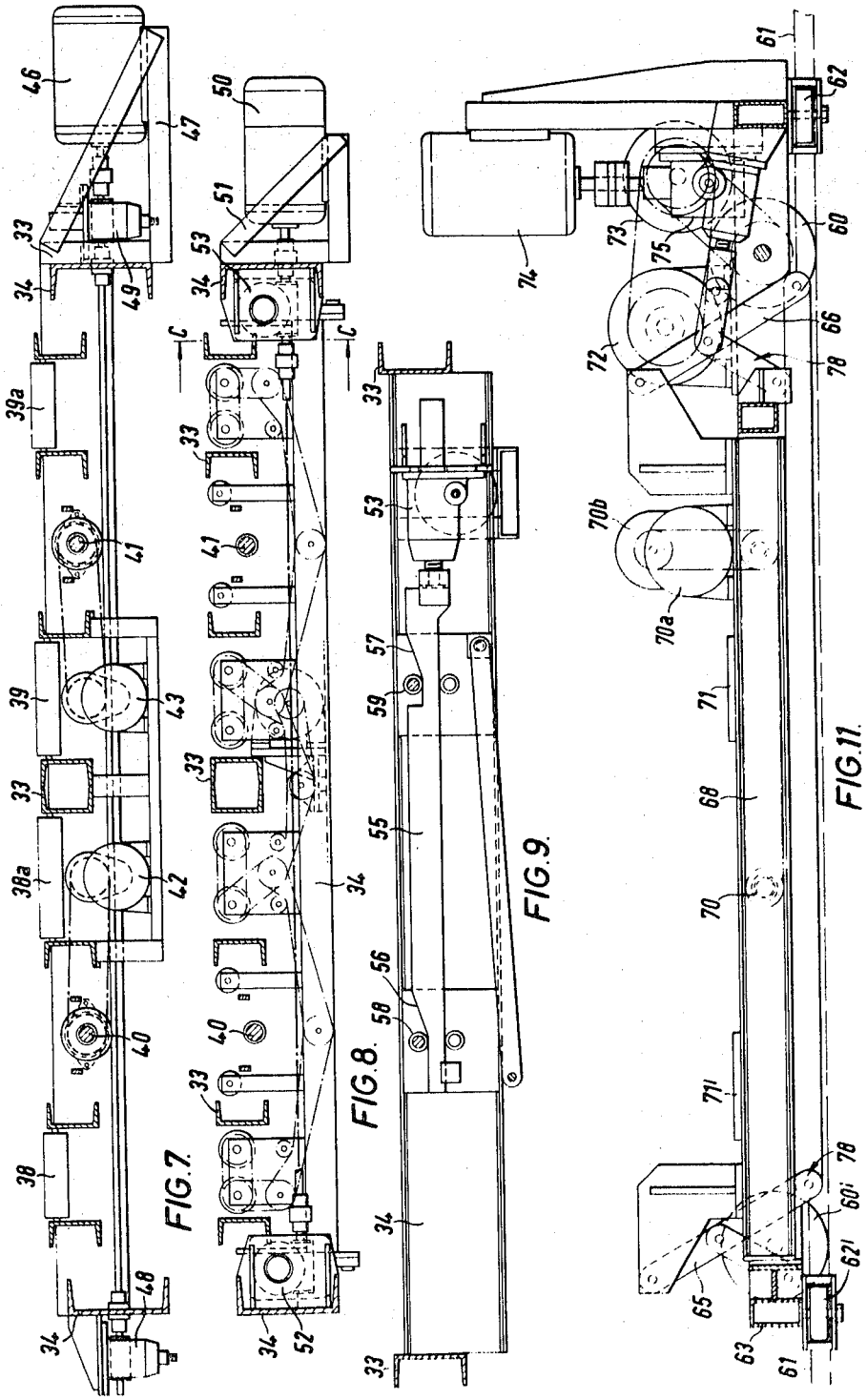

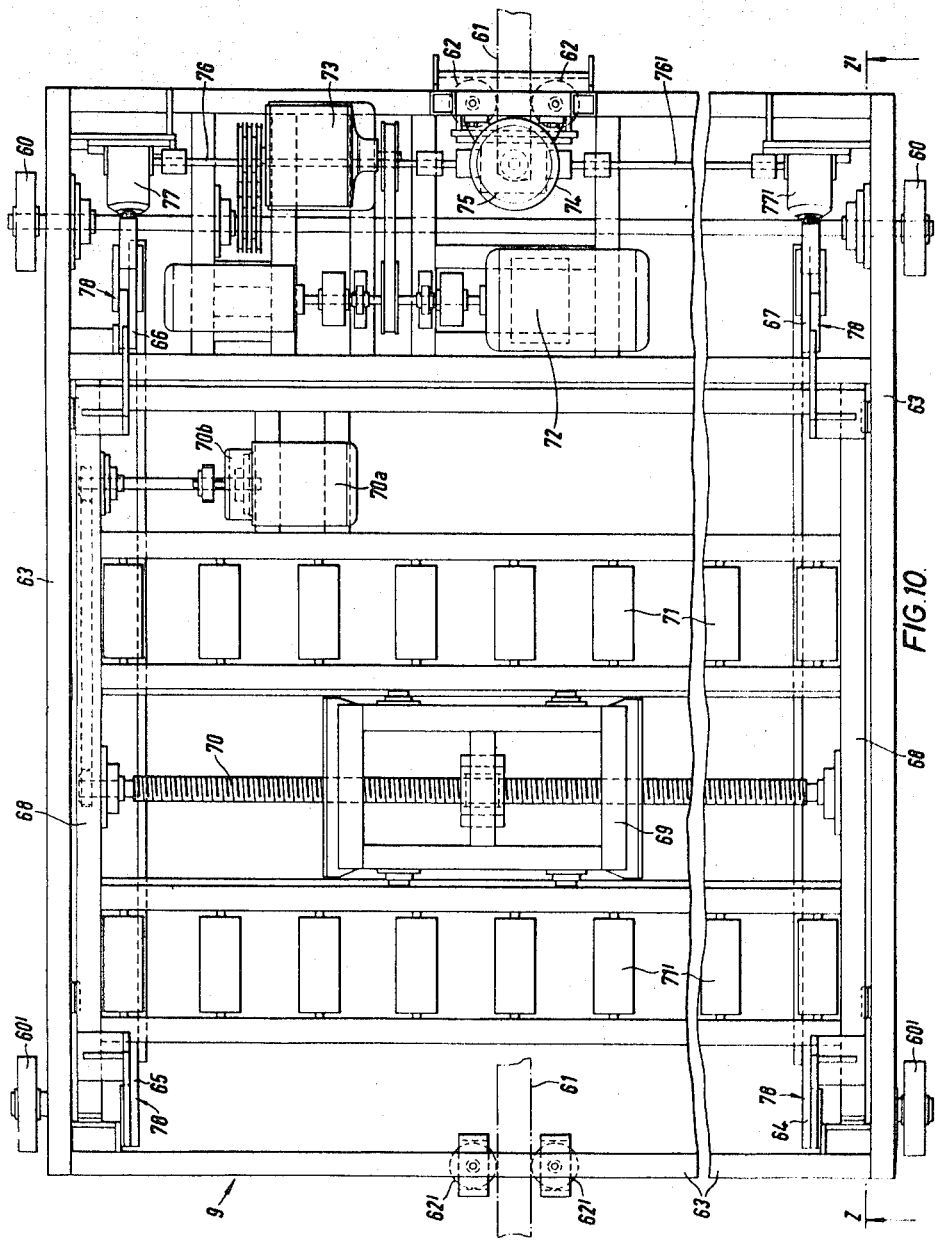

INVENTOR
Gabor Jeno Sarvary
BY Sparrow and Sparrow
ATTORNEYS

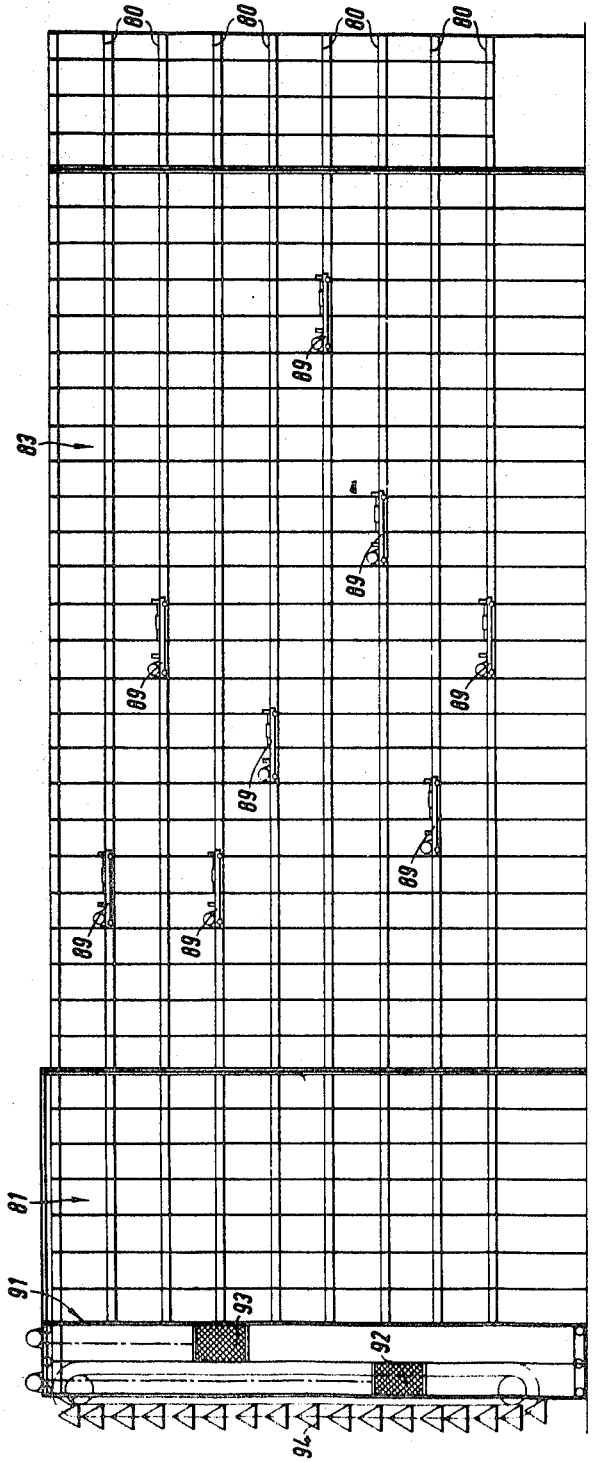

MECHANIZED PALLETIZED STORAGE SYSTEMS

This invention relates to a system for the automatic control of the selection and distribution of goods contained in pallets or like containers and to apparatus for use in such a system.

The invention has particular application to a system and apparatus for the storage, handling and replenishment of goods in warehouses and the invention will be described with particular reference to such an application, although it will be appreciated that the invention is in no way limited to warehousing systems and apparatus.

An object of the invention is to provide a three-dimensional system and apparatus for the storage and handling of goods which allows goods located in pallets in a plurality of rows of rack storage locations, and at different levels, to be accessible to a handler or operator for the removal of goods from the pallets in accordance with predetermined requirements.

Another object of the present invention is to provide a three-dimensional automated-warehousing system wherein goods are stored in a plurality of storage locations accessible from an aisle and loaded and returned to storage from the same aisle.

A further object of the invention is to provide a three-dimensional automated-warehousing system which permits input loads to be stored in random order, which permits random access to goods while held in bulk storage and which permits sequential access to goods in active storage.

A still further object of the invention is to provide a pallet-handling device capable of removing pallets from storage locations and transferring the pallets in a direction normal to the direction of withdrawal.

According to the present invention there is provided a three-dimensional automated system for the storage, handling, selection and distribution of goods stored in pallets comprising a plurality of different pallet storage levels each having a palletized storage area having a plurality of rows of pallet storage locations extending along at least one aisle, a pallet-handling device at each level operable to transfer pallets from one row to another, the palletized storage area at each level having a number of storage locations equivalent to a complete row, left vacant, and control means operable to move the pallet handling device opposite a selected row of storage locations and to withdraw a pallet from the selected row and transfer the withdrawn pallet in a direction normal to the direction of withdrawal to place the withdrawn pallet opposite a row adjacent that from which the pallet was withdrawn.

According to a further aspect of the invention, there is provided a three-dimensional automated system and apparatus for the storage, handling, selection and distribution of goods comprising a palletized storage area including a plurality of rows of pallet storage locations provided at a plurality of levels with pallets arranged to be stored in all but a number of storage locations at each level equivalent to the number of locations in a complete row, a hoist operable at any of said levels, and movable to a position adjacent any of said rows of storage locations, to allow a handler carried thereby to remove goods from selected pallets, and having associated therewith a plurality of pallet handling devices, one for each level and each operable between two adjacent rows of the respective level to withdraw a pallet from storage and transfer any withdrawn pallet to an adjacent row, and control means operable to move said hoist to any level and to move the pallet-handling devices opposite a selected row, to withdraw a pallet from the row, to transfer the pallet in a direction normal to the direction of withdrawal thereof and to place the pallet in a position for operation thereon by the handler and to transfer the pallet after said operation to a different storage location.

In a preferred embodiment of the invention goods in pallets are stored in random order in a bulk store on either side of a central aisle and are transferred to a pallet replenishment store by means of a transfer trolley, as required. The replenishment store is located on either side of the central aisle and forms an extension of the bulk store and each replenishment store is located opposite a live store and spaced therefrom by an auxiliary aisle containing a picking tower on which a handler is stationed. The picking tower may be positioned adjacent any row of the live store and is provided with an elevator platform capable of carrying the handler to any level of the three-dimensional warehouse complex. The picking tower in each auxiliary aisle has associated therewith a pallet handling device capable of moving in a direction parallel to a row of pallets to withdraw a pallet from the live store to a position accessible to the handler, of moving in a direction transverse to the direction of withdrawal to place a partially emptied pallet opposite a vacant row of the live store and of moving in a direction opposite to the direction of withdrawal to reinsert the pallet in the live store. If, however, a pallet has been completely emptied during a picking operation, the emptied pallet is transferred by the pallet-handling device to a vacant location in the replenishment store, on the opposite side of the auxiliary aisle from the live store, to await collection by the transfer trolley in the main central aisle. The pallet handling device in the auxiliary aisle transfers a full pallet from the replenishment store to a position accessible to the handler such that a picking operation may be completed, following which the pallet is returned to a vacant location of the live store by means of the two-directional movement of the pallet-handling device.

The transfer trolley, in a further embodiment of the invention comprises a main frame having running wheels driven by driving means mounted on the main frame for conveying the trolley along an aisle in one direction and a lifting frame on the main frame and vertically movable such as to uncouple a pallet located on the lifting frame, from a coupled train of pallets, and a cross travel unit on the lifting frame arranged to move in a direction normal to the direction of travel of the trolley, such as to effect withdrawal of a pallet from any selected row of storage locations.

In a further embodiment of the invention, a picking tower is located in an aisle flanked by pallet storage racks and is arranged to receive pallets from storage locations and conveyed to the tower by means of a transfer trolley, the tower including a platform having two sets of rollers extending at right angles to each other such as to move pallets in one direction for withdrawal of pallets from storage or insertion of a pallet in any selected storage location, and in a direction normal to the direction of withdrawal for a specific purpose.

Several embodiments of the invention will now be described by way of example only with particular reference to the accompanying drawings wherein:

FIG. 6 is a plan view of a two-directional pallet-handling platform;

FIG. 7 is a part sectional view of the platform taken along the lines A-A of FIG. 6;

FIG. 8 is a part sectional view taken along the lines B—B of FIG. 6;

FIG. 9 is a sectional view taken along the lines C—C of FIG. 8;

FIG. 10 is a plan view of a pallet-handling trolley;

FIG. 11 is a sectional view taken along the line Z-Z' of FIG. 10;

FIG. 12 is a schematic plan view of another embodiment of the invention showing an automated warehousing complex with picking towers and FIG. 13 is an elevation section taken along the lines A-A' of FIG. 12.

Figure 1:
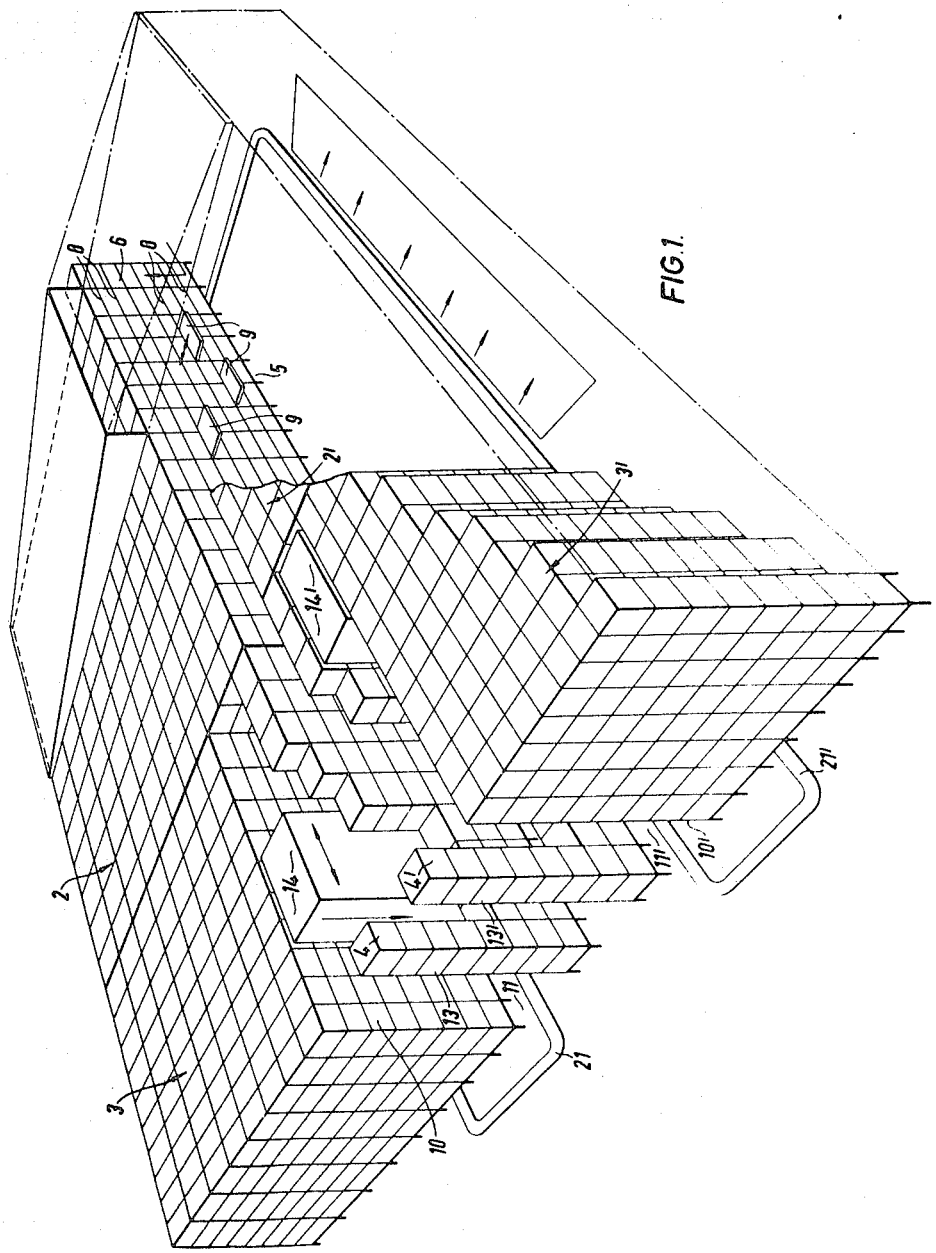
FIG. 1 is a perspective schematic view of a three-dimensional automated warehousing complex.
Figure 2:
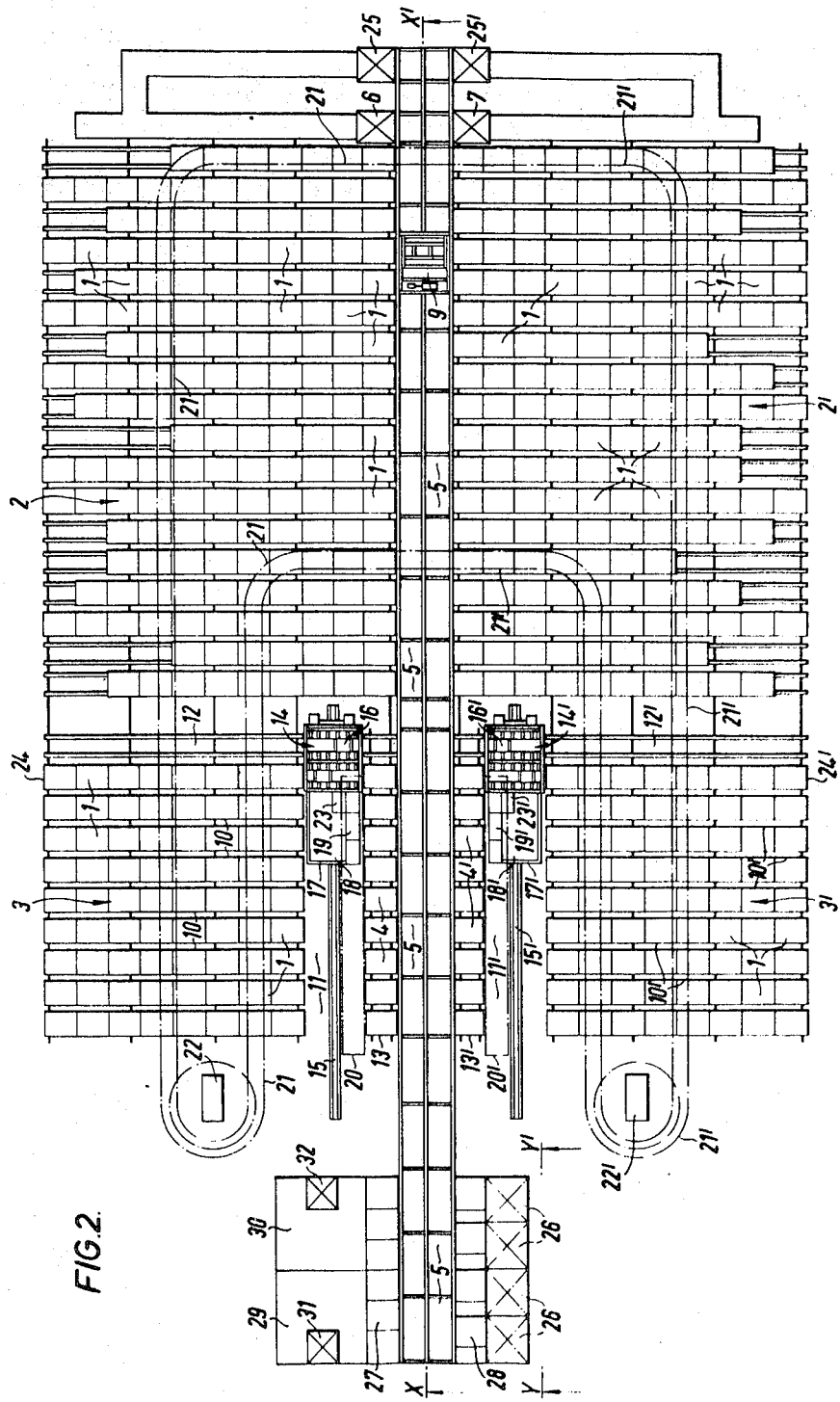
FIG. 2 is a schematic plan view of an automated warehousing complex.
Figure 3:
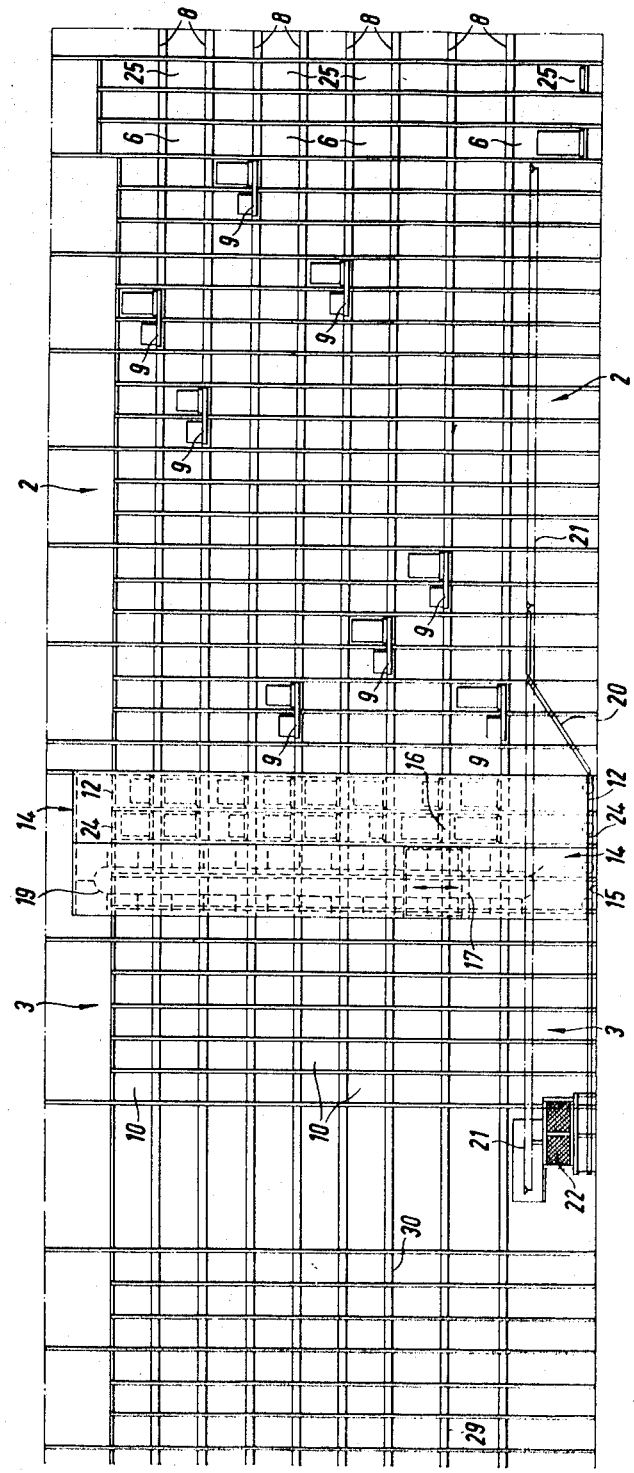
FIG. 3 is an elevation section taken along the lines X-X' of FIG. 2.

Referring firstly to FIGS. 1, 2, 3 and 4, the warehouse area is divided into a plurality of pallet storage locations for the storage of pallets 1 and formed from a plurality of rows of pallet storage racks extending in depth and arranged at different levels to provide three-dimensional storage. The warehouse complex is divided into backup storage areas or bulk stores 2, 2' (FIG. 2) live store areas or order picking areas 3, 3' and pallet replenishment areas 4, 4'. The bulk store areas 2, 2', each consist of a plurality of rows of pallet storage locations and the areas are located on either side of a central aisle 5 and are stocked with pallets 1 arranged in random order. The location of each and every pallet is known to the computer and is stored in the computer memory. An input elevator is located on either side of the central aisle as shown at 6 and 7 whereby fully loaded pallets are transported to any one of a number of storage levels 8 (FIG. 3). The fully loaded pallets 1 are discharged from the elevator 6 or 7 on to a transfer trolley 9 running along the aisle 5 at each level 8, under the control of the computer, and transported thereby to any one of the storage locations of the bulk stores 2, 2'. As shown in FIG. 2, a number of storage locations in the bulk stores 2, 2' are left vacant to allow pallets to be inserted therein or withdrawn from storage as will be hereinafter described.

The order-picking areas or live stores 3, 3' each consist of a plurality of rows of storage racks 10, 10', located adjacent respective aisles 11, 11', at each level of the warehouse complex. The depth of each live store in the particular embodiment illustrated, is less than that of the bulk stores and whereas the order of the pallets in the bulk stores is random, the pallets of the live stores are always arranged in the same sequential order. A complete row 12, 12', of each live store 3, 3' is left vacant for a purpose hereinafter described. Thus, of the ten rows of each live store 3, 3' shown in FIGS. 2 and 3, only nine rows are utilized for the storage of pallets 1 containing active stock. In the live stores there is one pallet for each type of merchandise.

On the opposite side of the aisles 11, 11' there are arranged further storage racks 13, 13', which as shown in FIG. 2, provide at each level, 10-pallet storage locations, but only nine in each batch are used for the storage of replenishment pallets, as will be described, and the racks 13, 13', are arranged along opposite sides of the central aisle 5 such that the transfer trolley 9 travels between the racks 13, 13' to serve either area during a pallet replenishment operation.

A pair of picking towers 14, 14' are arranged to move along the aisles 11, 11', respectively and are designed to run on rails or tracks 15, 15' such as to be moved across the faces of the live stock storage racks 10, 10', for the transfer of pallets from the live stores to platforms 16, 16' provided at each storage level 8. Each platform 16, 16' forms part of a two-directional pallet removal unit capable of operating on pallets stored on either side of the aisles 11, 11'; each unit being capable of being moved opposite a pallet in one row on one side of the respective aisle or the other, of being coupled to a selected pallet, of being movable in a direction parallel to a row to remove a pallet from the row, of being raised or lowered to decouple the selected pallet from the remainder in the selected row, of being moved transversely to position the withdrawn pallet opposite an adjacent row, and of being raised or lowered and moved in a direction opposite to that in which the pallet was withdrawn so as to transfer the pallet to the adjacent row and couple the pallet to any other pallets in the adjacent row.

The storage racks are preferably provided with rollers or light link roller chains to reduce frictional resistance when pallets are being moved into and out of the storage locations. Alternatively, the pallets may be provided with antifriction devices on the underneath surface, such as rollers, to allow the pallets to move as a train along the rows, but such that during movement of the two-directional pallet removal units 16, 16', any pallet supported by a unit becomes uncoupled from the train to allow the pallet to be withdrawn from the selected row, moved transversely and inserted in an adjacent row, where it is coupled to any pallets already stored in the adjacent row.

The coupling devices for the pallets may comprise L-shaped hooks or angled channel members provided at both ends of each pallet. With such an arrangement, the pallets would travel as a coupled train along the rows of storage racks with the hooks or channel members interlinked, but would become uncoupled by movement of the pallets in a direction transverse to the rows or by raising or lowering the platform 16, 16' on which a pallet is supported.

The picking towers 14, 14' are each provided with an elevating carriage 17, 17', to allow an operator or handler to be situated at any level and to move from one level to another to effect a goods-picking operation. With the picking towers 14, 14', a pallet withdrawal—transverse transfer—pallet reinsertion operation can be carried out at all levels simultaneously. The operator or handler removes goods from a selected pallet withdrawn from storage on to the platform 16, 16', and places the goods on to a picking conveyor 18, 18' which deliver the goods to a carton lowerator 19, 19' communicating via respective belt conveyors 20, 20', with tilt tray sorters 21, 21', driven by suitable mechanism 22, 22'. The sortation system operates at a lower level of the warehouse. An indicator counter 23, 23' is located adjacent the respective picking conveyor to provide the handler with an indication of the number of goods to be removed from a pallet.

Alternatively, the handler may transfer the goods removed from the pallet to the picking conveyor in the manner of an automaton until an instruction or indication is received by the handler that particular order or picking requirements have been satisfied, following which a barrier or like device prevents further goods from being conveyed away from the order-picking area.

For a picking operation, the active stock stores 3, 3', will have been primed with fully loaded pallets but with rows 12, 12', for instance, completely devoid of pallets. The picking towers 14, 14', would be under the control of the computer and would initially be located adjacent the empty rows 12, 12', and the adjacent full rows 24, 24', i.e. with the two-directional pallet removal platforms 16, 16', extending across the adjacent rows 12, 24; 12', 24'; The constructional features of a pallet-handling unit will be described with reference to FIGS. 6 to 9 inclusive in due course to explain how the units at each storage level 8 move simultaneously towards the racks and drag the trains of pallets from rows 24, 24', on to the platforms 16, 16'. When the first pallet in a row is located on the respective platform, the pallet is decoupled from the train by raising or lowering the platform and the pallet is then in a position for an order picking operation to be performed thereon. The digital display 23, 23' provides the handler with an indication of the number of items picked from a pallet and as they are removed from the pallet, the goods are conveyed to the carton lowerator 19 and dispatched to the sortation system as described. When an indication is received by the handler that the correct number of items have been removed from the pallet, the operator moves the elevating carriage 17, 17', to another level to perform an order picking operation on a pallet at a different level. The unloaded pallet i.e. the pallet from which a predetermined number of goods have been removed, is moved laterally i.e. in a direction normal to the direction of withdrawal of the pallet, and located opposite the empty row 12, 12'. At this point the direction of movement is changed to insert the pallet in the empty row and if, as the order-picking operation continues, an unloaded pallet is placed in a row already containing unloaded pallets, the platform is raised or lowered to effect recoupling of the pallets as a train.

It will be appreciated that the picking towers allow an operator to perform a picking operation from a plurality of different pallets at different levels without requiring movement of the picking towers until a selected pallet has been unloaded at each level of the warehouse complex; the only movement required being in respect of the elevating platforms 17, 17', conveying the handler to a different level after an order-picking operation has been completed from a pallet at another level. If necessary, several handlers may perform picking operations simultaneously at different levels. Multiple orders would be picked simultaneously and a final sortation would take place to break down the picked goods into individual orders, assembling these on to separate conveyor units.

Figure 5:
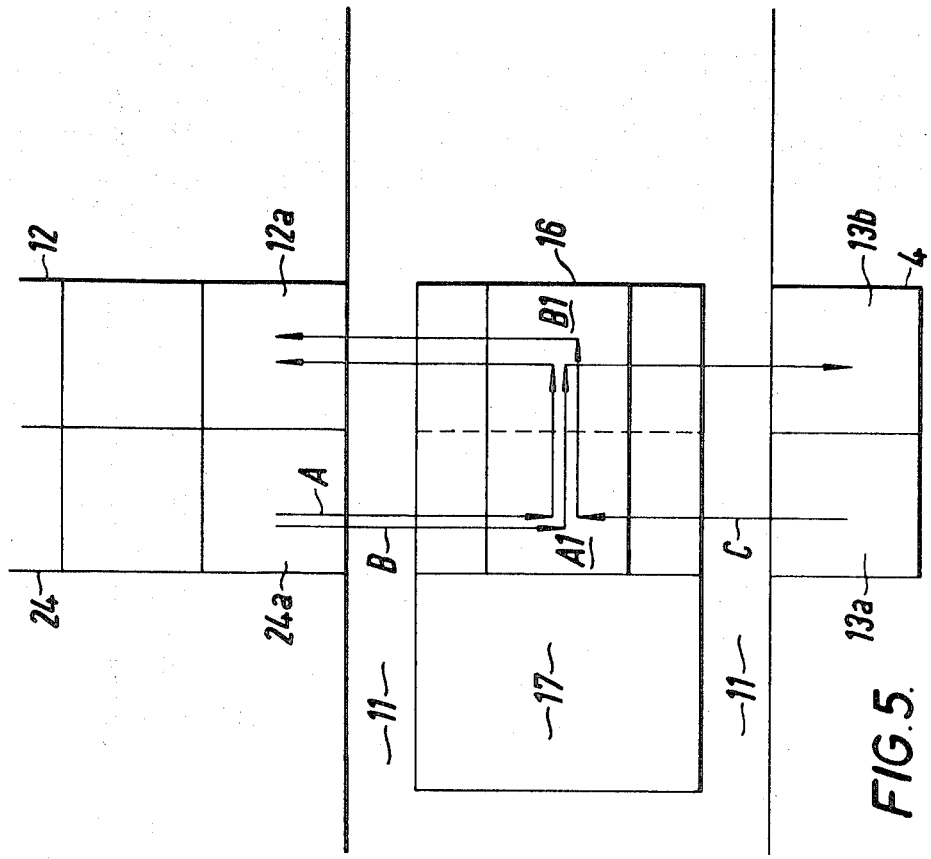
FIG. 5 is a diagram showing the movements by pallets between locations of the live store and replacement store.

When a pallet 1, removed from either of the live stores 3, 3', contains insufficient goods to satisfy a particular picking operation, a replenishment operation is required to replace the empty pallet by a full pallet containing the same items of goods and awaiting pickup from the replenishment racks 4, 4'. In FIG. 5 reference A shows the route along which a partially unloaded pallet 1 travels. The pallet is withdrawn from location 24a in row 24 and goods are removed therefrom by the handler on elevating platform 17 while the pallet is at position A1. After a picking operation, the partially unloaded pallet is moved transversely to position B1 and then in a direction at right angles thereto into empty location 12a of row 12.

Where a pallet is completely unloaded during a picking operation, it follows route B and instead of inserting the pallet in row 12, it is moved in the opposite direction from position A1 of platform 16 and via position B1 to the empty storage location 13b of the replenishment area 4 where it awaits removal by means of the transfer trolley 9. A description of the constructional features of a transfer trolley will be referred to in due course with reference to FIGS. 10 and 11.

Prior to the completion of the order-picking operation on the emptied pallet, the computer control would, in anticipation of the requirement of a full replacement pallet, have effected the withdrawal of a full pallet from the bulk store 2 by means of the transfer trolley 9 and the transfer of the full pallet to the replenishment rack store location 13a (FIG. 5). Thus, as soon as the completely emptied pallet has vacated the picking position A1 and been inserted in location 13b via position B1, the full pallet is removed from location 13a and routed via route C to position A1 where the order picking operation is completed. When the requisite number of goods have been removed from the pallet, it is moved transversely to position B1 and thence into location 12a of row 12 of the live store to await a further order picking operation. The above arrangement always maintains the goods in the live stores 3, 3', in the same sequential order, although it will be appreciated that as all the pallets of a single row e.g. 24 are removed in turn and subsequently reinserted in the empty row 12, the series of pallets will be reversed in order after each complete picking cycle.

The emptied pallet 1 temporarily stored in location 13b (FIG. 5) will be transferred to the transfer trolley 9 and discharged on to one or other of the empty pallet lowerators 25, 25', from whence it is taken to a "goods inwards" area of the warehouse at a lower level (see FIG. 1) and filled with goods before return to either of the bulk stores 2,2', via respective input elevators 6, 7.

Figure 4:
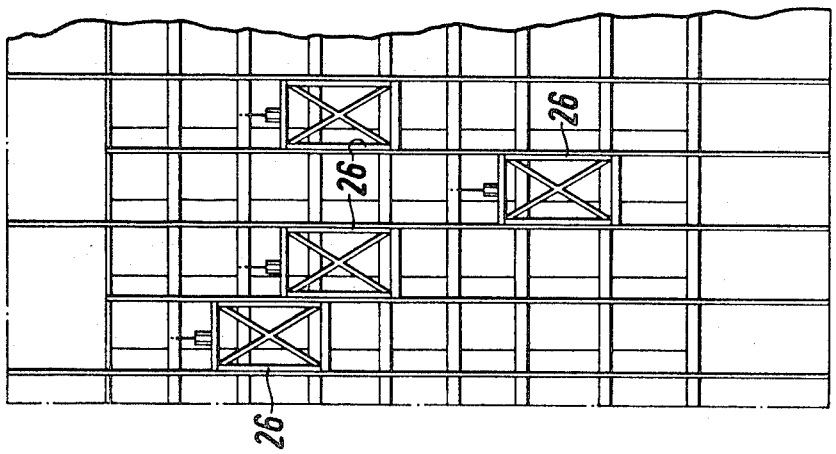
FIG. 4 is an elevation section taken along the lines Y-Y' of FIG. 2.

From the above, it will be seen that the picking towers 14, 14' simplify an order-picking operation in that all vertical locations are fixed and achieved automatically and it is only necessary to control the horizontal locations thereof. An additional picking facility may be provided and as shown in FIGS. 2, 3 and 4 this facility comprises four lifts 26 together with pallet-picking positions 27, 28, to accommodate handlers on either side of the main aisle 5. A pair of mezzanine platforms 29, 30 at each level together with associated carton lowerators 31, 32 may also be provided and the picking facility is fed from a plurality of transfer trolleys 9, one of which is provided at each storage level 8. The additional picking facility may or may not be provided and may have any or all of the components shown in FIGS. 2 to 4.

A preferred construction of picking tower platform 16 is shown in FIGS. 6, 7, 8 and 9. The platform comprises a main frame 33 having a subframe 34 journaled in the main frame at 35, 35'. Two cross-travel units 36, 37, spaced apart on the subframe 34 enable pallets to be moved from either edge of the platform to a central position accessible to a handler on the picking tower platform 17, and two sets of spaced antifriction rollers 38, 38a; 39, 39a; are associated with the cross-travel units 36, 37, respectively to permit pallets to travel freely over the surface of the platform 16. The cross-travel units 36, 37 comprise lead screws 40, 41 respectively, arranged to be driven by a pair of DC electric motors 42, 43 mounted on the main frame. A further set of spaced rollers 44, 44a is provided extending at right angles to the rollers 38, 38a; 39, 39a; to allow pallets to be moved from a position adjacent the handler (position A1 of FIG. 5) to the position B1 where the pallet is removed from the platform in a direction normal to the direction in which the rollers 44, 44a extend, by means of cross-travel unit 37 and rollers 39, 39a to transfer a pallet to a storage location of the live store 3, 3', or of a replenishment area 4, 4'.

The rollers 44, 44a are arranged to be driven by means of a DC electric motor 45 mounted on the main frame.

As shown, the subframe is journaled at 35 in the main frame and is thus able to tilt with respect to the main frame. This enables a pallet located on the rollers 38, 38a; or 39, 39a; to be disengaged or decoupled from a train of pallets stored in the storage racks, or to be coupled thereto whenever it is required to remove a pallet from storage or place the pallet in a selected storage location respectively. A DC electric motor 46 mounted on an extension 47 of the main frame is arranged to effect the tilting of the subframe 34 about journal 35 by operation of the jacks 48, 49, located at either end of the main frame 33 adjacent the subframe 34.

A further DC motor 50 mounted on a further extension 51 of the main frame controls the vertical movement of subframe 34 by operation of the jacks 52, 53 and actuation of the respective cams 54, 55 coupled thereto; the movement of the jacks effecting horizontal movement of the respective cams 54, 55, such that the cam faces 56, 57 engage the cam followers 58, 59 thereby causing the subframe carrying the roller assemblies to be raised to uncouple any pallet required to be withdrawn from storage.

A preferred construction of transfer trolley 9 capable of conveying pallets along an aisle, of withdrawing pallets from and inserting pallets in storage locations of the warehouse and of moving pallets in a transverse manner, is illustrated in FIGS. 10 and 11; the trolley being particularly suitable as a pallet replenishment trolley. The trolley is provided with two pairs of running wheels 60, 60', arranged to run on rails (not shown). A central guide rail 61 is provided and cooperates with two pairs of guide wheels or rollers 62, 62' located at each end of the trolley 9. The trolley comprises a static portion and a movable section, the former consisting of a rectangular frame 63 coupled via links 64, 65, 66, 67 at the four corners, to a vertically movable lifting frame 68. A cross travel unit 69 permits pallets to be moved from one side of the trolley to the other at right angles to the direction of movement of the trolley, under the control of a lead screw 70 driven by means of a motor 70a via gear box 70b and while the pallet is supported on the rollers 71, 71', located on either side of the cross-travel unit 69.

The driving wheels 60 of the trolley are arranged to be driven by means of a DC motor 72 through the gearbox 73 and the back e.m.f. of the motor is used to effect braking of the trolley. The motor 74 is arranged to drive, via a gearbox 75, the two shafts 76, 76', extending from the gearbox 75 to two power jacks 77, 77', which are coupled to four toggle members 78 to effect lifting of the frame 68. The main drive of the trolley 9 allows it to be positioned opposite any particular row of storage racks and the cross travel unit 69 permits a pallet to be withdrawn from a row of storage locations on to the trolley where the lifting frame permits vertical movement of the pallet to uncouple the withdrawn pallet from a train. The pallet may then be dispatched to any other storage location by the trolley and off-loaded into a replenishment storage location or other vacant location.

Figure 12:
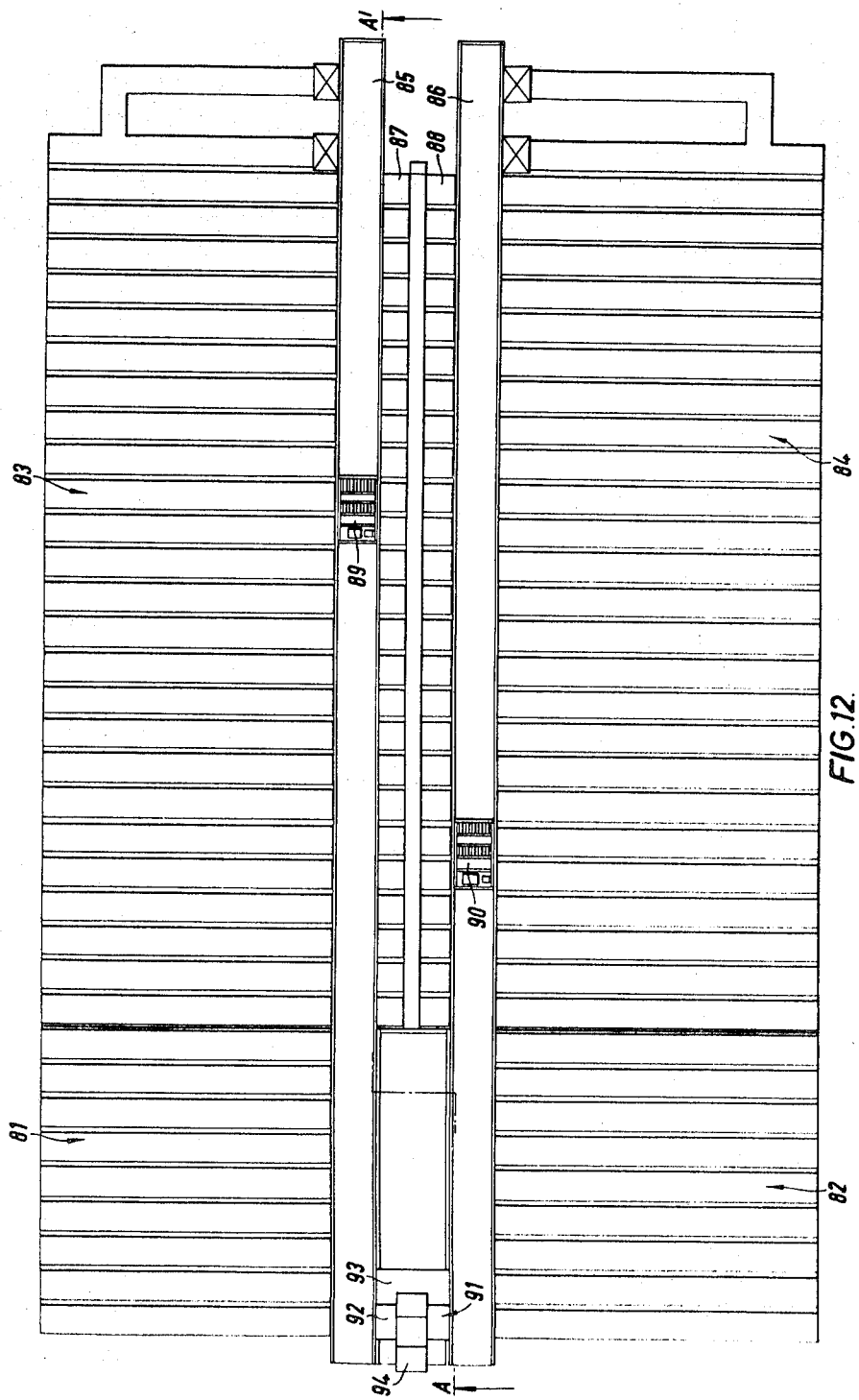

An alternative three-dimensional automated-warehousing complex is illustrated in FIGS. 12 and 13 where a plurality of storage levels 80 are provided, each level containing active stock storage in depth in racks 81, 82, and bulk stock storage in racks 83, 84 running along the lengths of aisles 85, 86 respectively. Between the aisles are pallet replenishment racks 87, 88, and transfer trolleys 89, 90 are arranged to run along the aisles 85, 86, respectively to withdraw pallets from storage and convey the pallets to a picking position at the respective level provided on a single picking tower 91 serving both aisles and both sets of storage racks. The tower has two elevator platforms 92, 93, for conveying a handler to any level of the warehouse and a recirculating carton lowerator or vertical carousel 94 for conveying goods removed from a pallet to a lower level. In a picking operation, a pallet is removed from the active stock racks 81, 82 and conveyed by transfer trolley 89 or 90 along aisle 85, 86, to a position adjacent picking tower 91 where the goods are unloaded by a handler standing on platform 92, 93, in accordance with particular requirements. After satisfying the picking order requirements, any partially unloaded pallet is returned to an empty row of the active stock area by means of trolley 89, 90. If, however, the pallet is completely emptied during a picking operation, the empty pallet is conveyed by the transfer trolley 89 or 90 to an empty pallet replenishment store location and inserted therein, and a full pallet is removed from the replenishment storage racks 87, 88 and conveyed to the handler on the picking tower by means of the transfer trolley 89 or 90, to allow the picking order operation to be completed.

It will be appreciated that the invention is capable of considerable modification and has been described by way of example only and is not to be deemed limited to the particular constructional features outlined above. The stores may include any number of storage locations and the pallets in each row may be coupled as described or uncoupled and pushed as a train.

I claim:

1. A three-dimensional system and apparatus for the storage, handling, selection and distribution of goods comprising a palletized storage area including a plurality of rows of pallet storage locations provided at a plurality of levels with pallets linked in a train of pallets to be stored in all but a number of storage locations at each level equivalent to the number of locations in a complete row, a hoist operable between said levels, and movable to a position adjacent any of said rows of storage locations, to allow a handler carried thereby to remove goods from selected pallets, and having associated therewith a plurality of pallet-handling devices, one for each level and each operable between two adjacent rows of the respective level to withdraw a pallet from storage and transfer any withdrawn pallet to an adjacent row, means for coupling said devices to said pallets, means on said devices for decoupling a pallet from said train of pallets, and control means operable to move said hoist to any level and to move the pallet-handling devices opposite a selected row, to withdraw a pallet from the row, to transfer the pallet in a direction normal to the direction of withdrawal thereof and to place the pallet in a position for operation thereon by the handler and to transfer the pallet after said operation to a different storage location.

2. A three-dimensional system for the storage, handling, selection and distribution of goods stored in pallets comprising a plurality of different pallet storage levels each having a palletized storage area having a plurality of rows of pallet storage locations extending along at least one aisle, a pallet-handling device at each level operable to transfer pallets from one row to another, the palletized storage area at each level having a number of storage locations equivalent to a complete row, left vacant, and control means operable to move the pallet-handling device opposite a selected row of storage locations and to withdraw a pallet from the selected row and transfer the withdrawn pallet in a direction normal to the direction of withdrawal to place the withdrawn pallet opposite a row adjacent that from which the pallet was withdrawn, a bulk store comprising a plurality of pallet storage locations within which pallets are arranged to be stored in random order, a pallet replenishment store having at least one vacant pallet storage location, a main aisle interconnecting the bulk and replenishment stores, a live store located on the opposite side of an auxiliary aisle from the replenishment store and wherein the pallets are stored in sequential order and wherein a number of storage locations equivalent to a complete row are left vacant, a replenishment trolley for withdrawing pallets from the bulk store and transferring any withdrawn pallet via the main aisle to a vacant location of the replenishment store and a picking tower located in the auxiliary aisle and including a two-directional transfer unit arranged to withdraw a pallet from the live store to a position accessible to an operator in order for an order-picking operation to be effected and for transferring the pallet in a direction transverse to the direction of withdrawal to a position opposite an empty storage location in the live store or replenishment store.

3. A three-dimensional system as claimed in claim 2 wherein said picking tower is arranged to move across the faces of the storage locations in the live store and includes a platform arranged to receive a pallet from a storage location, means for effecting vertical movement of the platform to disengage a pallet from an associated train of pallets and means for moving a pallet on the platform in a direction transverse to the direction of withdrawal to place the pallet opposite an adjacent row of the live store.

4. A three-dimensional system as claimed in claim 2, wherein the picking tower is provided with an elevator platform for conveying a handler to any one of such storage levels.

5. A three-dimensional system as claimed in claim 2, wherein the picking tower is provided with a conveyor arranged to deliver goods removed from a pallet at any level to a lowerator communicating via a further conveyor with a sorting device.

6. A three-dimensional system for the storage, handling, selection and distribution of goods stored in pallets comprising a plurality of different pallet storage levels each having a palletized storage area having a plurality of rows of pallet storage locations extending along at least one aisle, a pallet-handling device at each level operable to transfer pallets from one row to another, the palletized storage area at each level having a number of storage locations equivalent to a complete row, left vacant, and control means operable to move the pallet-handling device opposite a selected row of storage locations and to withdraw a pallet from the selected row and transfer the withdrawn pallet in a direction normal to the direction of withdrawal to place the withdrawn pallet opposite a row adjacent that from which the pallet was withdrawn, a plurality of pallet storage location of a main store extending along one side of each of a pair of aisles and having a pallet replenishment store located between and serving both aisles, a picking tower located at one end of the aisles and arranged to receive pallets from storage locations and conveyed to the tower along either aisle by means of transfer trolleys adapted to remove a pallet from any selected storage location, to convey the pallet to the tower and return the pallet to a vacant storage location of the main store or replenishment store under the control of the control means and according to whether the pallet is completely emptied during a picking operation performed thereon, or not.

7. A three-dimensional system for the storage, handling, selection and distribution of goods stored in pallets comprising a plurality of different pallet storage levels each having a palletized storage area having a plurality of rows of pallet storage locations extending along at least one aisle, a pallet handling device at each level operable to transfer pallets from one row to another, the palletized storage area at each level having a number of storage locations equivalent to a complete row, left vacant, and control means operable to move the pallet-handling device opposite a selected row of storage locations and to withdraw a pallet from the selected row and transfer the withdrawn pallet in a direction normal to the direction of withdrawal to place the withdrawn pallet opposite a row adjacent that from which the pallet was withdrawn a pallet-handling device comprising a main frame having running wheels driven by driving means mounted on the main frame for conveying the device in a direction transverse to the direction of withdrawal of a pallet from a storage location, and a lifting frame on such main frame having a cross-travel unit mounted thereon for removing a pallet from a selected storage location, and said lifting frame being vertically movable to disengage any selected pallet from an associated chain of pallets.

8. A three-dimensional system for the storage, handling, selection and distribution of goods stored in pallets, comprising a plurality of different storage levels, each having a palletized storage area having a plurality of rows of pallet storage locations extending along at least one aisle, at least some of said rows containing a plurality of pallets coupled together to move as a train of pallets, a pallet-handling device at each level operable to transfer pallets from one row to another, control means for moving said pallet handling device opposite a selected row of storage locations, means linked with said pallet handling device to couple said device to that pallet of the selected row adjacent said pallet-handling device, means mounted on said pallet-handling device to withdraw the selected pallet from the selected row in a direction normal to the direction of travel of said pallet handling device, means for uncoupling said selected pallet from said train, and means for transferring said pallet-handling device and selected pallet in a direction normal to the direction of withdrawal.

* * * * *